US012633613B2

(12) United States Patent
Kim et al.

(10) Patent No.: US 12,633,613 B2
(45) Date of Patent: *May 19, 2026

(54) FIXING STRUCTRE FOR BATTERY RACK, ENERGY STORAGE SYSTEM, AND POWER GENERATION SYSTEM

(71) Applicant: LG ENERGY SOLUTION, LTD., Seoul (KR)

(72) Inventors: Hee-Chan Kim, Daejeon (KR); Kyung-Min Lee, Daejeon (KR); Seung-Jun Lee, Daejeon (KR); Kown Son, Daejeon (KR); Goan-Su Jung, Daejeon (KR); Jong-Soo Lee, Daejeon (KR); Seung-Joon Jeon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 437 days.

This patent is subject to a terminal disclaimer.

(21) Appl. No.: 18/026,462

(22) PCT Filed: Sep. 28, 2021

(86) PCT No.: PCT/KR2021/013281
§ 371 (c)(1),
(2) Date: Mar. 15, 2023

(87) PCT Pub. No.: WO2022/065996
PCT Pub. Date: Mar. 31, 2022

(65) Prior Publication Data
US 2023/0344063 A1 Oct. 26, 2023

(30) Foreign Application Priority Data
Sep. 28, 2020 (KR) ........................ 10-2020-0126310

(51) Int. Cl.
*H01M 50/264* (2021.01)
*H01M 50/209* (2021.01)

(52) U.S. Cl.
CPC ....... *H01M 50/264* (2021.01); *H01M 50/209* (2021.01)

(58) Field of Classification Search
None
See application file for complete search history.

(56) References Cited

U.S. PATENT DOCUMENTS 4,317,497 A 3/1982 Alt et al.
2002/0086202 A1 7/2002 Stone et al.
(Continued)

FOREIGN PATENT DOCUMENTS

CN 103943794 A 7/2014
CN 111196446 A 5/2020
(Continued)

OTHER PUBLICATIONS

International Search Report (PCT/ISA/210) issued in PCT/KR2021/013281, dated Jan. 27, 2022.
(Continued)

*Primary Examiner* — Barbara L Gilliam
*Assistant Examiner* — Jordan E Berresford
(74) *Attorney, Agent, or Firm* — Birch, Stewart, Kolasch & Birch, LLP

(57) ABSTRACT

A battery rack includes a plurality of battery modules; and a rack case configured to accommodate the plurality of battery modules and mount another rack case above, wherein the rack case includes a fixing unit provided on a lower end portion of the rack case, wherein the fixing unit includes a main body part of a plate shape. The main body part includes a fixing groove formed to be recessed from an edge of the main body part, and wherein the rack case includes at least one bolt provided on an upper end portion of the rack case and configured to be inserted into the fixing groove included in a lower end of the other rack case.

14 Claims, 9 Drawing Sheets

(56)  References Cited

U.S. PATENT DOCUMENTS

| | | | |
|---|---|---|---|
| 2005/0259404 A1 * | 11/2005 | Marraffa | H01M 50/224 |
| | | | 361/726 |
| 2005/0281002 A1 | 12/2005 | Miller | |
| 2013/0143092 A1 | 6/2013 | Nagatani et al. | |
| 2013/0316212 A1 | 11/2013 | Lee et al. | |
| 2014/0073204 A1 | 3/2014 | Ramey et al. | |
| 2014/0134460 A1 | 5/2014 | Youn | |
| 2015/0303421 A1 | 10/2015 | Tazawa et al. | |
| 2016/0099489 A1 | 4/2016 | Park et al. | |
| 2017/0125772 A1 | 5/2017 | Leung et al. | |
| 2017/0331166 A1 | 11/2017 | Hasegawa | |
| 2020/0243813 A1 | 7/2020 | Zhang et al. | |

FOREIGN PATENT DOCUMENTS

| | | | | | |
|---|---|---|---|---|---|
| CN | 210577082 | U | | 5/2020 | |
| JP | 59-173971 | A | | 10/1984 | |
| JP | 7-2095 | A | | 1/1995 | |
| JP | 2001-15090 | A | | 1/2001 | |
| JP | 2004-273428 | A | | 9/2004 | |
| JP | 4711308 | B2 | | 6/2011 | |
| JP | 2012-84486 | A | | 4/2012 | |
| JP | 2012-147523 | A | | 8/2012 | |
| JP | 2015-204262 | A | | 11/2015 | |
| JP | 2019-207847 | A | | 12/2019 | |
| JP | 6729689 | B2 | | 7/2020 | |
| KR | 20000038535 | A | * | 7/2000 | G02F 1/133308 |
| KR | 20-0224746 | Y1 | | 5/2001 | |
| KR | 10-0896769 | B1 | | 5/2009 | |
| KR | 10-1278979 | B1 | | 7/2013 | |
| KR | 10-2015-0113688 | A | | 10/2015 | |
| KR | 10-1661563 | B1 | | 10/2016 | |
| KR | 10-2017-0073393 | A | | 6/2017 | |
| KR | 20170073393 | A | * | 6/2017 | H01M 2/1077 |
| KR | 10-1787617 | B1 | | 10/2017 | |
| KR | 10-1843398 | B1 | | 3/2018 | |
| KR | 10-1850076 | B1 | | 4/2018 | |
| KR | 10-2020-0104515 | A | | 9/2020 | |
| WO | WO 2012/026224 | A1 | | 3/2012 | |
| WO | WO 2017/037999 | A1 | | 3/2017 | |

OTHER PUBLICATIONS

Extended European Search Report for European Application No. 21873024.0, dated Oct. 28, 2024.
Extended European Search Report for European Application No. 25219921.1, dated Feb. 23, 2026.

* cited by examiner

100

200

120A

A

120B

200

FIXING STRUCTRE FOR BATTERY RACK, ENERGY STORAGE SYSTEM, AND POWER GENERATION SYSTEM

TECHNICAL FIELD

The present disclosure relates to a battery rack, an energy storage system, and a power generation system, and more particularly, to a battery rack that is easy to install, an energy storage system, and a power generation system.

The present application claims priority to Korean Patent Application No. 10-2020-0126310 filed on Sep. 28, 2020 in the Republic of Korea, the disclosure of which is incorporated herein by reference.

BACKGROUND ART

Currently commercialized secondary batteries include nickel cadmium batteries, nickel hydrogen batteries, nickel zinc batteries, lithium secondary batteries, etc. Among these secondary batteries, because the lithium secondary batteries have almost no memory effect compared to nickel-based secondary batteries, the lithium secondary batteries have been spotlighted owing to advantages of free charging and discharging, a very low self-discharge rate, and a high energy density.

Such a lithium secondary battery mainly uses lithium-based oxides and carbon materials as positive electrode active materials and negative electrode active materials, respectively. The lithium secondary battery includes an electrode assembly in which a positive electrode plate and a negative electrode plate on which a positive electrode active material and a negative electrode active material are respectively coated are arranged with a separator interposed therebetween, and a sheath material, that is, a battery case, that seals and accommodates the assembly together with an electrolyte solution.

Recently, secondary batteries are widely used not only in small devices such as portable electronic devices but also in medium and large devices such as vehicles and energy storage systems (ESSs). When secondary batteries are used in such medium and large devices, a large number of secondary batteries are electrically connected in order to increase capacity and output power. In particular, pouch type secondary batteries are widely used in such medium and large devices because of advantages such as easy lamination.

Meanwhile, as the need for a large-capacity structure, including its use as an energy storage source, recently increases, demand for a battery rack including a plurality of secondary battery cells electrically connected in series and/or parallel, a battery module accommodating the plurality of secondary battery cells therein, and a battery management system (BMS) is increasing.

In addition, it was common for such a battery rack to include a rack case made of a metal material to protect or store a plurality of battery modules from external impact. Moreover, as the demand for a high-capacity battery rack is increasing recently, the demand for a battery rack in which a plurality of battery modules of a heavy load is accommodated is increasing.

However, it was very difficult to accurately position the battery rack of heavy load at a fixing point of an installation site. That is, it was inevitable to move the battery rack of heavy load using transportation equipment, and, when such transportation equipment is used, it was not easy to precisely adjust the position of the battery rack. Accordingly, an arrangement between battery racks is not even, which may cause a problem in that an electrical connection between the battery racks, or a connection of a firefighting facility, etc. may not be smooth.

Moreover, it was more difficult to install the battery rack of heavy load in a narrow site, as well as transport of the battery rack of heavy load. Accordingly, in the related art, it was difficult to efficiently utilize a space of the installation site where the battery rack is installed, and thus there were many restrictions in increasing the energy density of an energy storage system including a plurality of battery racks.

DISCLOSURE

Technical Problem

The present disclosure is designed to solve the problems of the related art, and therefore the present disclosure is directed to providing a battery rack that is easy to install, an energy storage system, and a power generation system.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery rack including a plurality of battery modules; and a rack case configured to accommodate the plurality of battery modules and mount to a second rack case above the rack case, the rack case includes a fixer provided on a lower end portion of the rack case, the fixer includes a main body part of a plate shape, wherein the main body part includes a fixing groove formed to be recessed from an edge of the main body part, and the rack case includes at least one bolt provided on an upper end portion of the rack case and configured to be inserted into the fixing groove included in a lower end of the second rack case.

The rack case may include a plurality of shelf frames configured to mount the plurality of battery modules; a front frame coupled to a front end of the plurality of shelf frames; and a rear frame coupled to a rear end of the plurality of shelf frames.

Each of the front frame and the rear frame may include a plurality of pillar portions extending long in a vertical direction; and a connector having a plate shape extending in a horizontal direction to connect upper portions of the plurality of pillar portions and including at least one bolt hole having a part punched such that the at least one is inserted.

The main body part may extend in the horizontal direction to connect lower end portions of the plurality of pillar portions, and the fixing groove may be formed to be recessed from an edge of the main body part so that a body of the at least one bolt is inserted.

The at least one bolt may protrude upward so that a part of the body is inserted into the at least one bolt hole of the connector, and a remaining part of the body is inserted into the fixing groove of the second rack case.

The fixing groove may include a taper portion having a width that is gradually reduced in a recessed direction from the edge of the main body part, and an accommodation portion having an opening such that the at least one bolt is accommodated.

The fixer may include a restraining bar configured to protrude so as to partition between the taper portion and the accommodation portion; and an accommodation groove having an internal space to accommodate at least a part of the restraining bar.

The fixer may include an elastic member provided in the accommodation groove and configured to pressurize the restraining bar to protrude from the accommodation groove.

Each of the front frame and the rear frame may include a bracket including a horizontal section_mounted on the fixer and including a slit groove having a shape corresponding to the fixing groove, and a vertical section having a shape bent and extending in an upper direction from an end portion of the horizontal section and configured to be bolt-fastened to a pillar portion of the plurality of pillar portions.

The fixer may further include a guide protruding and extending in an outer direction from the edge of the main body part so as to guide a movement of the fixer.

The guide may have a shape bent upward at a predetermined angle from the main body part.

The guide may include an extension groove communicatively connected to the fixing groove and formed to be recessed from an edge protruding and extending from the main body part.

In another aspect of the present disclosure, there is provided an energy storage system including at least one battery rack described above.

In another aspect of the present disclosure, there is provided a power generation system including at least one battery rack described above.

Advantageous Effects

According to an aspect of the present disclosure, the present disclosure stacks at least two rack cases in the up-down direction, fixes the rack case located below to the ground, and fixes the rack case located above to the upper portion of the rack case located below, thereby further utilizing the upper space of the space in which the battery rack is accommodated, thereby effectively increasing the energy density to the space of the battery rack.

Moreover, the present disclosure includes the fixing groove in the fixing unit of the battery rack, and thus having the advantage of stacking the plurality of battery racks in the up-down direction and easily achieving fixing between the battery racks.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE OF DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
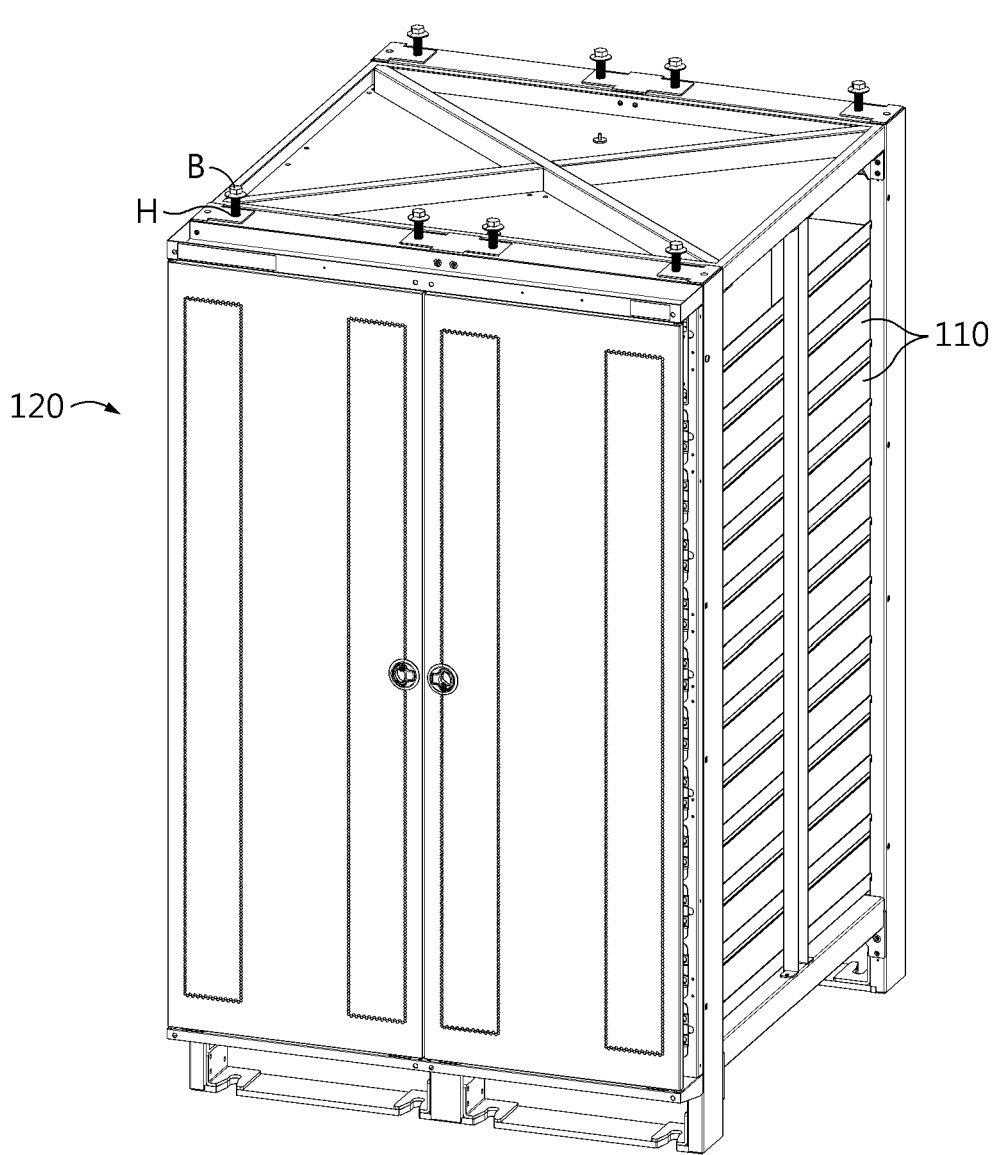
FIG. 1 is a perspective view schematically illustrating a battery rack according to an embodiment of the present disclosure.
Figure 2:
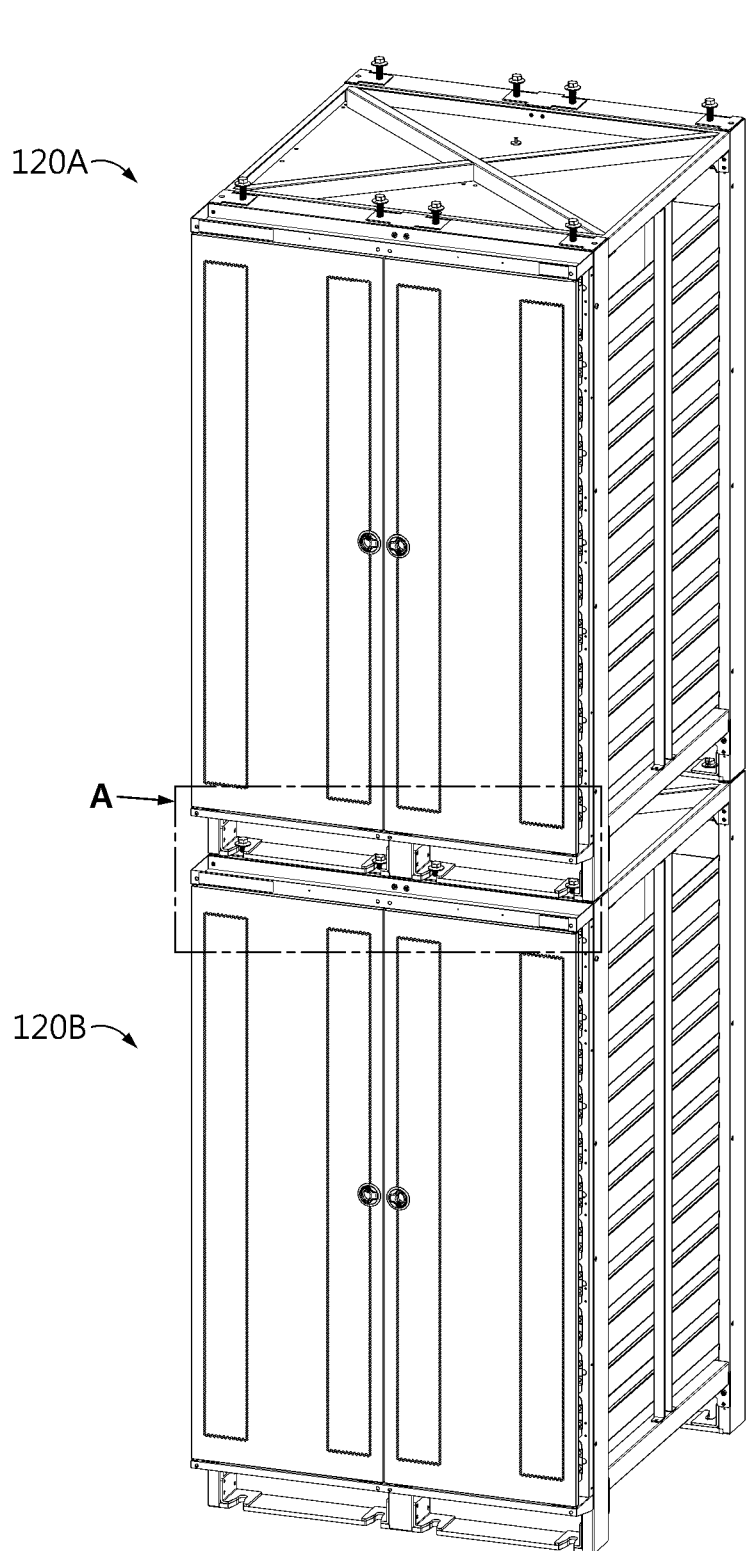
FIG. 2 is a front perspective view schematically illustrating a battery rack according to another embodiment of the present disclosure.
Figure 3:
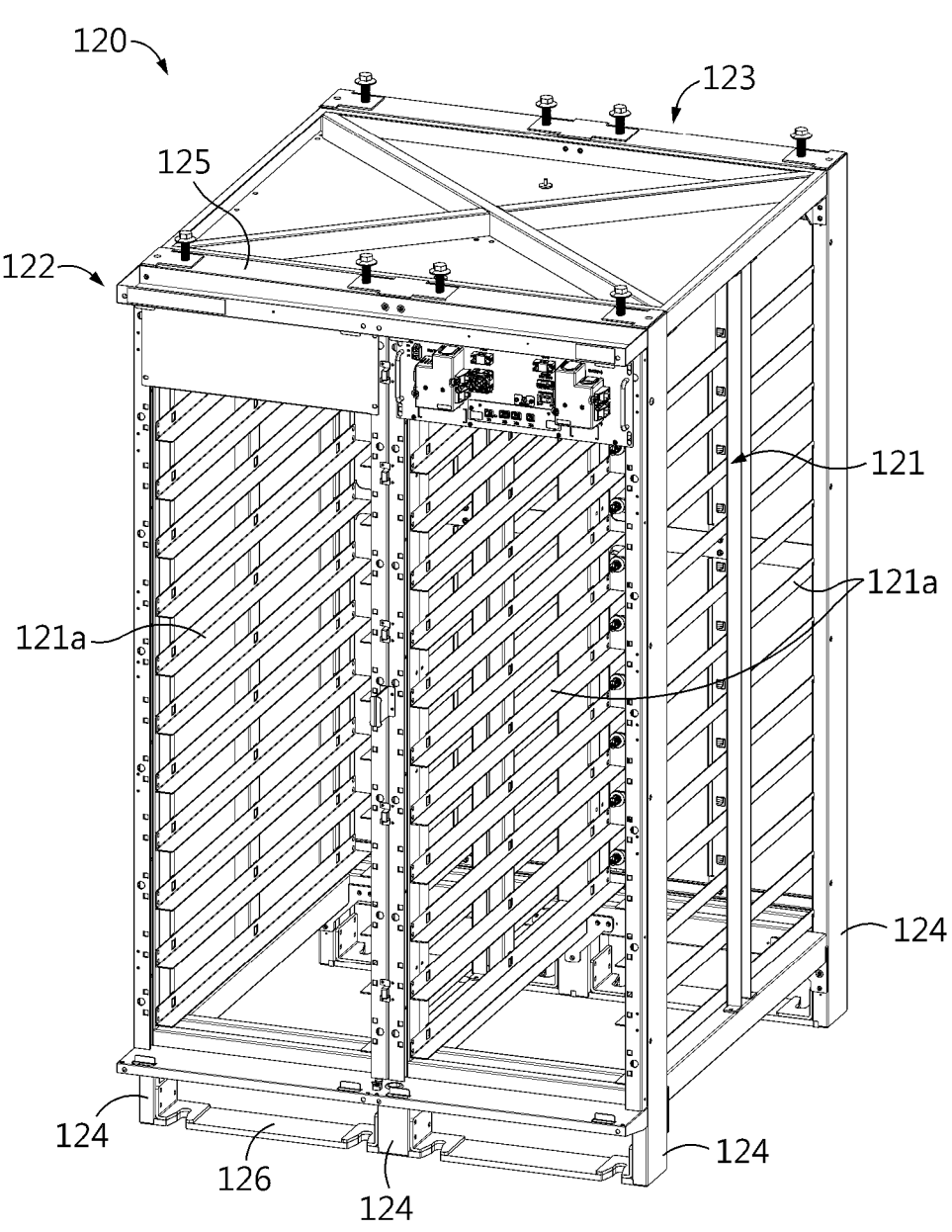
FIG. 3 is a perspective view schematically illustrating a rack case of the battery rack according to an embodiment of the present disclosure.
Figure 4:
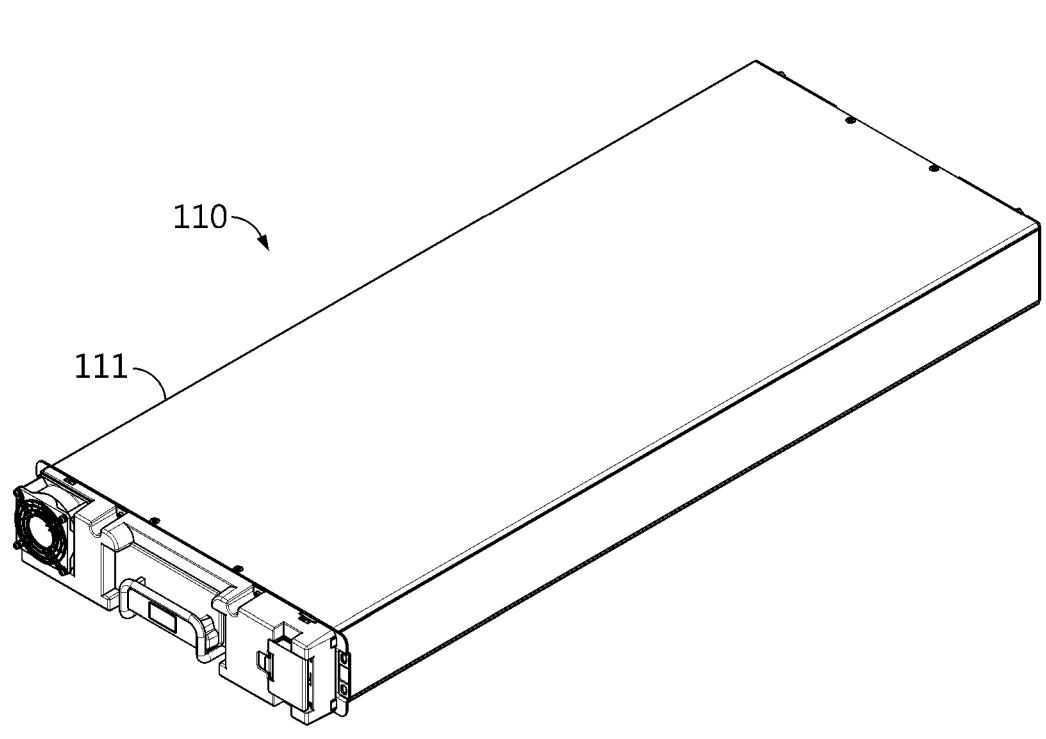
FIG. 4 is a perspective view schematically illustrating a rack module of a battery rack according to an embodiment of the present disclosure.

FIG. 1 is a perspective view schematically illustrating a battery rack according to an embodiment of the present disclosure. FIG. 2 is a front perspective view schematically illustrating a battery rack according to another embodiment of the present disclosure. FIG. 3 is a perspective view schematically illustrating a rack case of the battery rack according to an embodiment of the present disclosure. FIG. 4 is a perspective view schematically illustrating a rack module of the battery rack according to an embodiment of the present disclosure. For reference, in FIG. 3, a front door of the rack case was removed so that the inside of the battery rack may be viewed.

Referring to FIGS. 1 to 4, a battery rack 100 according to an embodiment of the present disclosure includes a plurality of battery modules 110, and at least one rack case 120 configured to accommodate the plurality of battery modules 110.

Specifically, the plurality of battery modules 110 may be accommodated in the rack case 120 so as to be arranged in an up-down direction. The battery module 110 may include a module housing 111 and a plurality of battery cells (not shown) provided inside the module housing 111 and stacked in one direction. For example, the battery cell may be a pouch-type battery cell.

However, the battery cell of the battery module 110 according to the present disclosure is not limited to the pouch-type battery cell described above, and various battery cells known at the time of filing of the present disclosure may be employed.

Specifically, a rack case 120A may be configured such that the other rack case 120A may be mounted above. For example, the battery rack 100 may include two or more rack cases 120A and 120B stacked in an up-down direction. Among the two or more rack cases 120A and 120B stacked in an up-down direction, an upper portion of the rack case 120B located relatively below and a lower portion of the rack case 120A located relatively above may be bolt-coupled to each other.

The rack case 120 may include a fixing unit 126 provided on a lower end of the rack case 120. The fixing unit 126 may include a main body part 126b of a plate shape. The main body part 126b may include a fixing groove 126h formed to be recessed from an edge of the main body part 126b.

Meanwhile, according to an embodiment of the present disclosure, the two or more rack cases 120A and 120B stacked in the up-down direction may be provided. At this time, the rack case 120B may include at least one bolt B provided on an upper end of the rack case 120B and configured to be inserted into the fixing groove 126h provided in the lower end of the other rack case 120A.

For example, the rack case 120B may include the at least one bolt B in which a part of the main body part is inserted into the upper end of the rack case 120B, and the other part of the main body part is inserted into the fixing groove 126h of the other rack case 120A mounted above.

At this time, among the two or more rack cases 120A and 120B stacked in the up-down direction, the rack case 120A disposed on the upper portion and the rack case 120B disposed on the lower portion may have the same structure as each other.

Meanwhile, referring back to FIG. 3, the rack case 120 may include a shelf frame 121, a front frame 122, and a rear frame 123.

Figure 5:
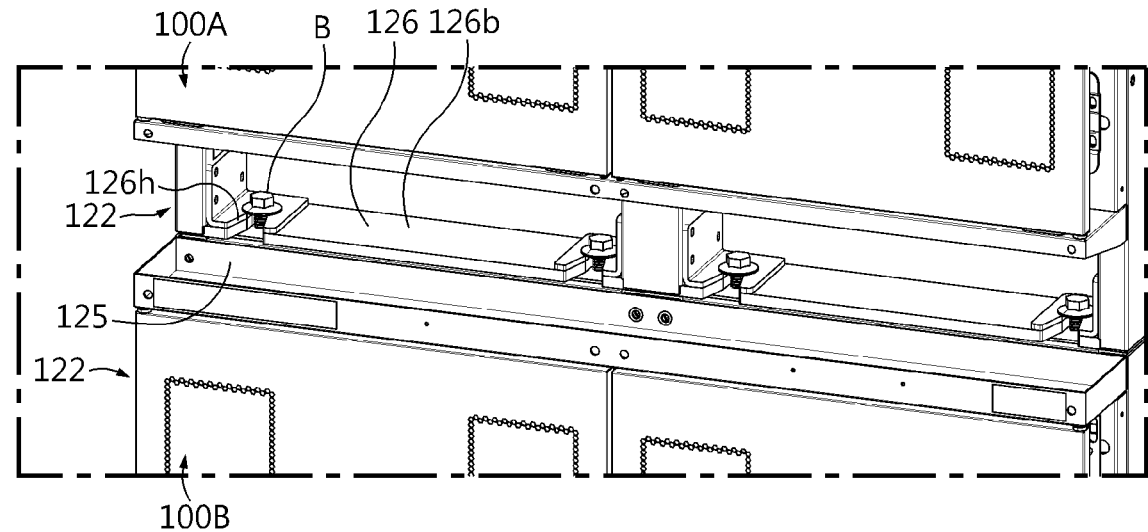
FIG. 5 is a partial perspective view schematically illustrating a region A of the battery rack of FIG. 2.

For example, as shown in FIGS. 2 and 5, the shelf frame 121 may be configured to mount the plurality of battery modules 110. Specifically, the shelf frame 121 may include a plurality of receiving plates 121a. The receiving plate 121a may have an 'L' shape and a plate shape bent at an angle of approximately 90 degrees. In addition, both ends of the receiving plate 121a in a front-rear direction may be configured to be respectively connected to the front frame 122 and the rear frame 123.

For example, as shown in FIG. 3, two receiving plates 121a may be provided to receive one battery module 110. The two receiving plates 121a may be configured to support the lower end portion of the battery module 110 in a left-right direction in an upper direction. In addition, the two receiving plates 121a may serve as a stopper for preventing the other battery module 110 placed below from moving in the upper direction.

Meanwhile, referring back to FIGS. 1 to 3, the front frame 122 may include a plurality of pillar portions 124 extending in the up-down direction. Upper end and lower end portions of the pillar portion 124 may be configured to be coupled to an external object, for example, bottom or ceiling, or the other rack case 120A. The pillar portion 124 may serve as a main skeleton of the overall shape that is a hexahedron of the rack case 120. For example, as shown in FIG. 1, the front frame 122 may include three pillar portions 124 positioned on the front end of the rack case 120.

In addition, the front frame 122 may include a connection unit 125 connecting upper end portions between the pillar portions 124 in a horizontal direction. For example, as shown in FIG. 3, the connection unit 125 may be configured to connect between the upper end portions of the three pillar portions 124. The connection unit 125 may have a plate shape extending in the horizontal direction, and may include at least one bolt hole H having a part punched such that the bolt B is inserted.

Furthermore, the front frame 122 may include a fixing unit 126 connecting lower end portions between the pillar portions 124 in the horizontal direction. For example, as shown in FIG. 2, the fixing unit 126 may be configured to connect between the lower end portions of the three pillar portions 124.

The rear frame 123 may include the plurality of pillar portions 124 extending in the up-down direction. The pillar portion 124 may serve as a main skeleton of the overall shape that is a hexahedron of the rack case 120. For example, as shown in FIG. 3, the rear frame 123 may include three pillar portions 124 positioned on the rear end of the rack case 120.

In addition, the rear frame 123 may include the connection unit 125 connecting upper end portions between the pillar portions 124 in the horizontal direction. For example, as shown in FIG. 3, the connection unit 125 may be configured to connect between the upper end portions of the three pillar portions 124. The connection unit 125 may have a plate shape extending in the horizontal direction, and may include the at least one bolt hole H having a part punched such that the bolt B is inserted.

Furthermore, the rear frame 123 may include the fixing unit 126 connecting lower end portions between the pillar portions 124 in the horizontal direction. For example, as shown in FIG. 3, the fixing unit 126 may be configured to connect between the lower end portions of the three pillar portions 124.

FIG. 5 is a partial perspective view schematically illustrating a region A of the battery rack of FIG. 2.

Referring to FIG. 5 together with FIGS. 2 and 3 again, the fixing unit 126 of the front frame 122 may include the main body part 126b of a plate shape extending in a horizontal direction. For example, the main body part 126b may extend in the horizontal direction to connect lower end portions of the plurality of pillar portions 124. The fixing unit 126 may include the fixing groove 126h formed to be inserted from an edge of the main body part 126b. The fixing groove 126h may have a slit shape such that the body of the bolt B provided in the connection unit 125 is slide-inserted in the horizontal direction.

For example, as shown in FIG. 5, the fixing unit 126 of the front frame 122 may include four fixing grooves 126h recessed rearward from a front end portion of the main body part 126b. The bolt B provided in the connection unit 125 may be inserted into each of the four fixing grooves 126h. At this time, the bolt B may be fixed to the connection unit 125 of the front frame 122 of the rack case 120B located below, among the two or more rack cases 120A and 120B stacked in an up-down direction. That is, by tightening the bolt B inserted into the fixing groove 126h, the fixing unit 126 of the rack case 120A located relatively above and the connection unit 25 of the rack case 120B located on a relatively lower portion may be bolt-coupled to each other.

Figure 6:
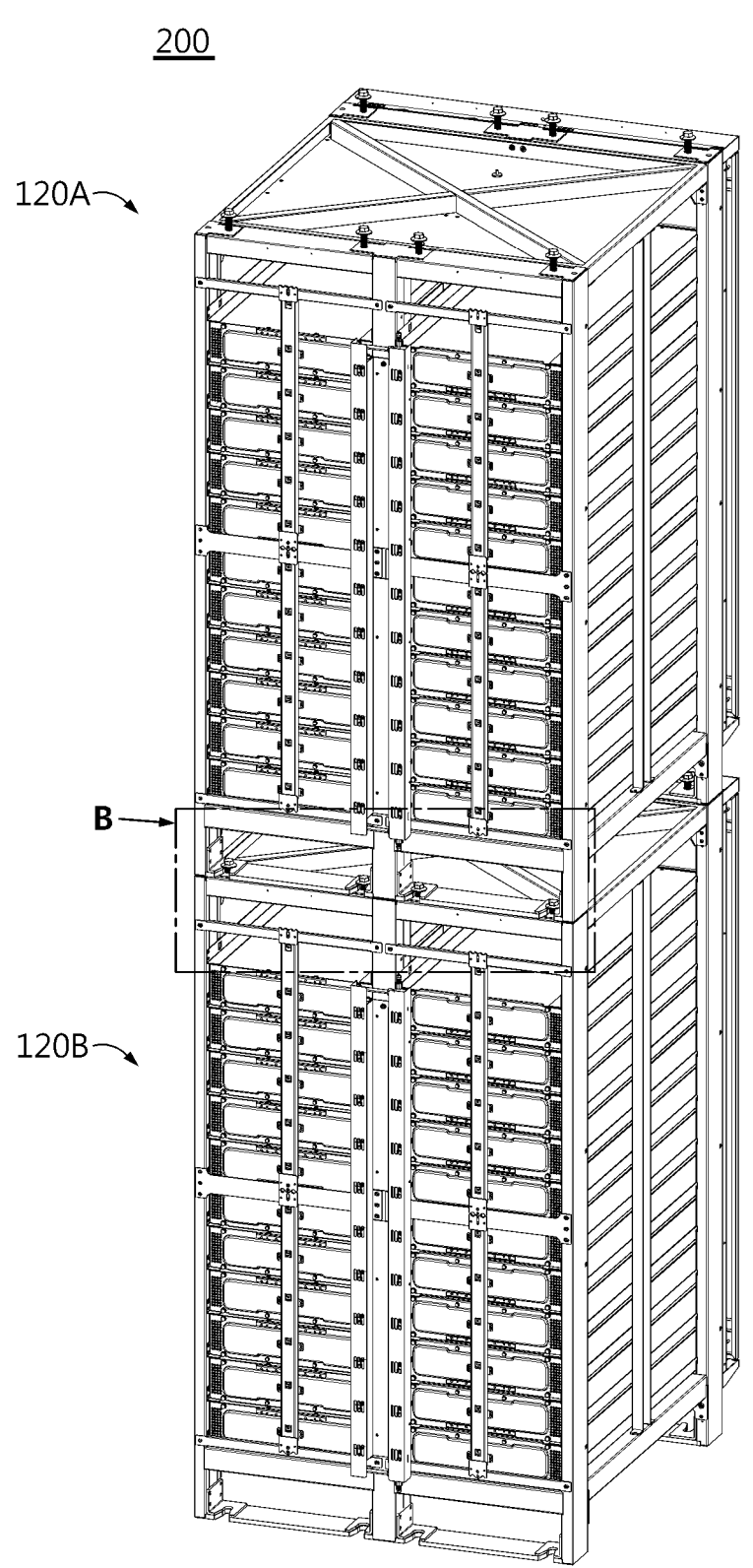
FIG. 6 is a rear perspective view schematically illustrating a battery rack according to another embodiment of the present disclosure.
Figure 7:
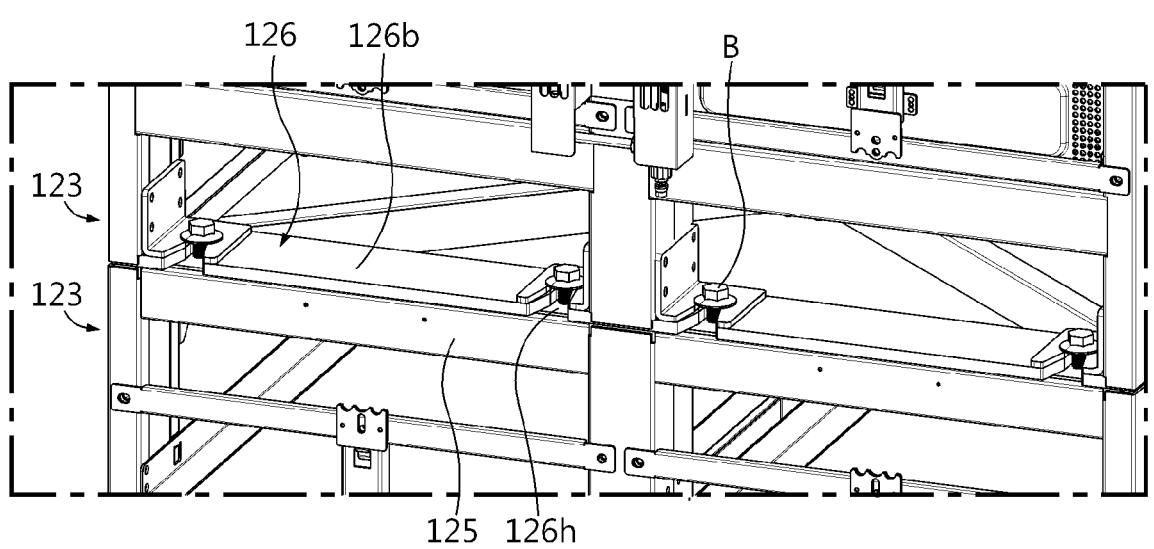
FIG. 7 is a partial perspective view schematically illustrating a region B of the battery rack of FIG. 6.

FIG. 6 is a rear perspective view schematically illustrating a battery rack according to another embodiment of the present disclosure. FIG. 7 is a partial perspective view schematically illustrating a region B of the battery rack of FIG. 6.

Referring to FIGS. 6 and 7, the fixing unit 126 of the rear frame 123 may include four fixing grooves 126*h* inserted rearward from a front end portion of the main body part 126*b*. The bolt B may be inserted into each of the four fixing grooves 126*h*. At this time, the bolt B may be fixed to the connection unit 125 of the rear frame 123 of the rack case 120B located below, among the two or more rack cases 120A and 120B stacked in an up-down direction. That is, by tightening the bolt B inserted into the fixing groove 126*h*, the fixing unit 126 of the rack case 120A located relatively above and the connection unit 25 of the rack case 120B located relatively below may be bolt-coupled to each other.

Meanwhile, referring to FIGS. 5 and 7 together with FIG. 1 again, each of the front frame 122 and the rear frame 123 of the present disclosure may include the at least one bolt B. The bolt B may be configured such that a lower end of the body is inserted into the bolt hole H of the connection unit 125. The remaining part of the body of the bolt B that is not inserted into the bolt hole H may be configured to be inserted into the fixing groove 126*h* of the other rack case 120A mounted on the upper portion. For example, the remaining part of the body of the bolt B that is not inserted into the bolt hole H may be a structure protruding upward so as to be inserted into the fixing groove 126*h* of the other rack case 120A mounted on the upper portion.

For example, as shown in FIG. 1, in the battery rack 100 of the present disclosure, the rack case 120B located below among the two rack cases 120A and 120B stacked in the up-down direction may include four bolts B and four bolt holes H in the connection unit 125 of the front frame 122, and may include four bolts B and four bolt holes H in the connection unit 125 of the rear frame 123.

In addition, as shown in FIG. 5, among the two rack cases 120A and 120B stacked in the up-down direction, the fixing unit 126 of each of the front frame 122 and the rear frame 123 of the rack case 120 located above may be bolt-fastened to the connection unit 125 of each of the front frame 122 and the rear frame 123 of the rack case 120 located below. At this time, the bolt B fixed to a bolt hole 125*h* of the connection unit 125 may slide and move in the horizontal direction to be inserted into the fixing groove 126*h* of the fixing unit 126.

Therefore, according to such a configuration of the present disclosure, the present disclosure stacks the at least two rack cases 120A and 120B in the up-down direction, fixes the rack case 120B located below to the ground, and fixes the rack case 120A located above to the upper portion of the rack case 120B located below, thereby further utilizing an upper space of the space in which the battery rack 100 is accommodated, thereby effectively increasing the energy density to the space of the battery rack 100.

Moreover, the present disclosure includes the fixing groove 236*h* in the fixing unit 126 of the battery rack 100, and thus having the advantage of stacking the plurality of battery racks 100 in the up-down direction and easily achieving fixing between the battery racks 100.

Figure 8:
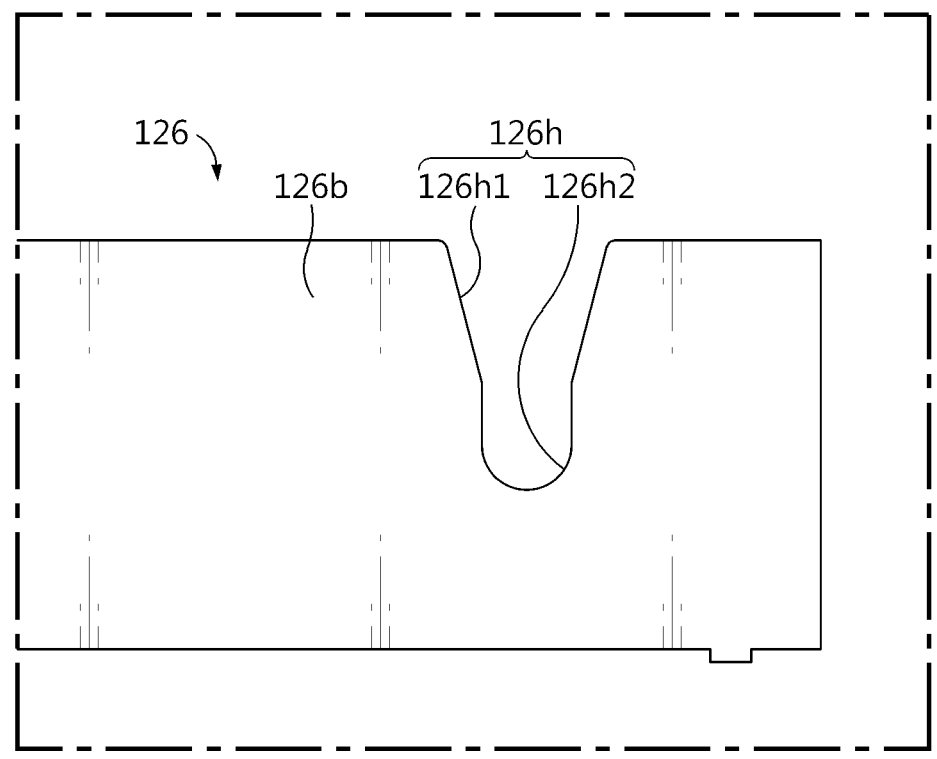
FIG. 8 is a partial plan view schematically illustration a part of a fixing unit of a battery rack according to an embodiment of the present disclosure.

FIG. 8 is a partial plan view schematically illustration a part of the fixing unit of the battery rack according to an embodiment of the present disclosure.

Referring to FIG. 8 together with FIG. 5, the fixing groove 126*h* of the present disclosure may include a taper portion 126*h*1 and an accommodation portion 126*h*2. At least a part of the taper portion 126*h*1 may have a shape in which the size of the groove is gradually reduced in a recessed direction from an edge of the main body part 126*b*. The accommodation portion 126*h*2 may have a space formed to be further recessed in an inside direction from the taper portion 126*h*1. The accommodation portion 126*h*2 may have a circular opening. The size of the groove of the taper portion 126*h*1 may be greater than the size of the body of the bolt B.

For example, as shown in FIG. 8, the fixing groove 126*h* may include the taper portion 126*h*1 formed to be recessed rearward from a front end portion. At this time, the taper portion 126*h*1 may have a shape in which the size of the groove is gradually reduced in the recessed direction from the edge of the main body part 126*b*. The accommodation portion 126*h*2 may have the opening in which the body of the bolt B may be accommodated.

Therefore, according to such a configuration of the present disclosure, the present disclosure includes the taper portion 126*h*1 and the accommodation portion 126*h*2 in the fixing groove 126*h*, so that the bolt B may move in a horizontal direction along an inner surface of the taper portion 126*h*1 of the fixing groove 126*h* and may be seated in the accommodation portion 126*h*2. Accordingly, the present disclosure may easily fix the rack case 120 to the bolt B fixed to the bottom through the fixing groove 126*h*.

Figure 9:
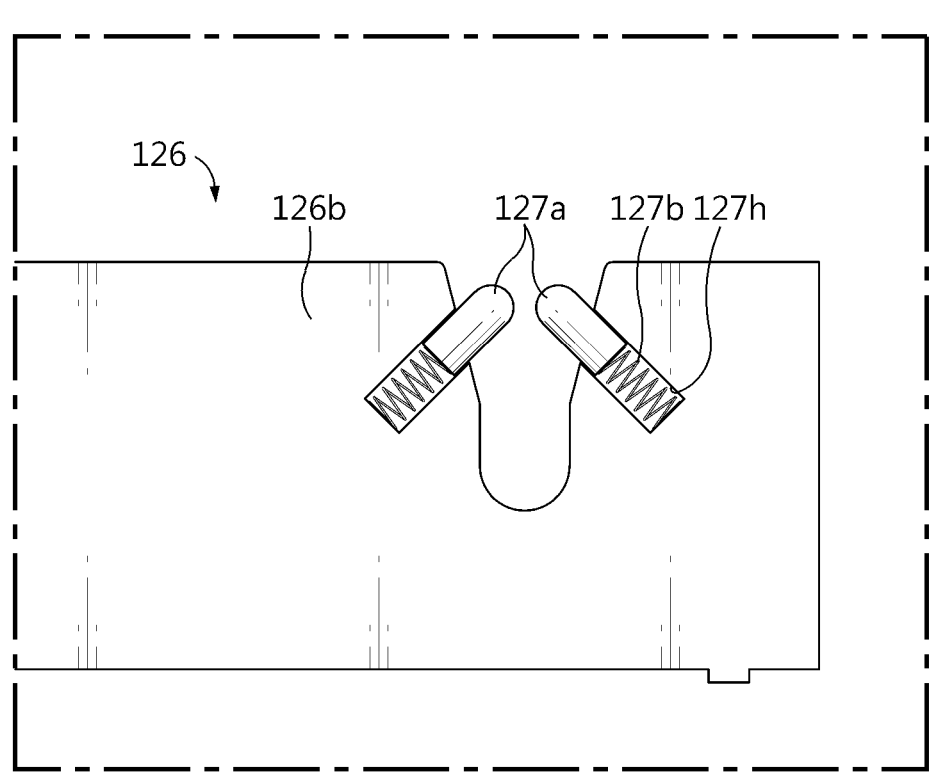
FIG. 9 is a partial plan view schematically illustrating a part of a fixing unit of a battery rack according to another embodiment of the present disclosure.

FIG. 9 is a partial plan view schematically illustrating a part of the fixing unit of the battery rack according to another embodiment of the present disclosure.

Referring to FIG. 9, the fixing unit 126 of the battery rack 100 according to another embodiment of the present disclosure may further include a restraining bar 127*a*, an accommodation groove 127*h*, and an elastic member 127*b*, as compared with the fixing unit 126 of FIG. 8.

Specifically, the restraining bar 127*a* may be configured to protrude so as to partition between the taper portion 126*h*1 and the accommodation portion 126*h*2. The restraining bar 127*a* may have a bar shape extending in a straight line. For example, as shown in FIG. 9, two restraining bars 127*a* may be provided in the fixing groove 126*h* of the fixing unit 126.

Also, the accommodation groove 127*h* may have an internal space to accommodate at least a part of the restraining bar 127*a*. For example, as shown in FIG. 9, the fixing groove 126*h* may include the two accommodation grooves 127*h* into which at least a part of the two restraining bars 127*a* is inserted.

Moreover, the elastic member 127*b* may be provided in the accommodation groove 127*h*. The elastic member 127*b* may be configured to pressurize the restraining bar 127*a* to protrude from the accommodation groove 127*h*. The elastic member 127*b* may include, for example, a spring.

Therefore, according to such a configuration of the present disclosure, the present disclosure includes the elastic member 127*b* configured to make the restraining bar 127*a* protrude to the outside from the accommodation groove 127*h*, and thus, when the bolt B is inserted into the fixing groove 126*h*, the restraining bar 127*a* may be accommodated in the accommodation groove 127*h*, and when the bolt B is positioned in the accommodation portion 126*h*2, the restraining bar 127*a* may protrude again from the accommodation groove 127*h* to the outside, thereby very easily achieving a process of fastening the bolt B to the fixing groove 126*h*. Accordingly, the present disclosure greatly facilitates installation of the battery rack 100.

Figure 10:
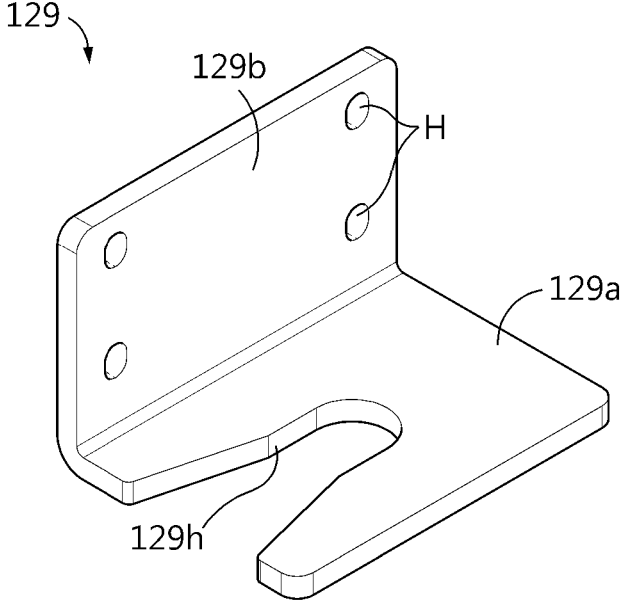
FIG. 10 is a perspective view schematically illustrating a bracket of a battery rack according to an embodiment of the present disclosure.

FIG. 10 is a perspective view schematically illustrating a bracket of the battery rack according to an embodiment of the present disclosure.

Referring to FIG. 10 together with FIGS. 3 and 5 again, the front frame 122 and/or the rear frame 123 of the battery rack 100 according to an embodiment of the present disclosure may include at least one bracket 129.

The bracket 129 may include a mounting unit 129*a* configured to face one surface of the fixing unit 126 so as to be mounted on the fixing unit 126. The mounting unit 129*a* may include a slit groove 129*h* having a shape corresponding to the fixing groove 126*h* of the fixing unit 126. That is, the slit groove 129*h* may be configured to be fixed in a state in which a head part of the bolt B is seated.

In addition, the bracket 129 may include a fastening unit 129*b* configured to be coupled to the pillar portion 124. The fastening unit 129*b* may have a shape bent and extending in an upper direction from an end portion of the mounting unit 129*a*. The fastening unit 129*b* may include a bolt hole so as to be bolt-fastened to the pillar portion 124. For example, as shown in FIG. 10, the bracket 129 may include four bolt holes H configured to be communicatively connected to the bolt hole H of the pillar portion 124.

For example, as shown in FIG. 5, the fixing unit 126 of the front frame 122 may include four brackets 129. For example, as shown in FIG. 7, the fixing unit 126 of the rear frame 123 may include four brackets 129.

Figure 11:
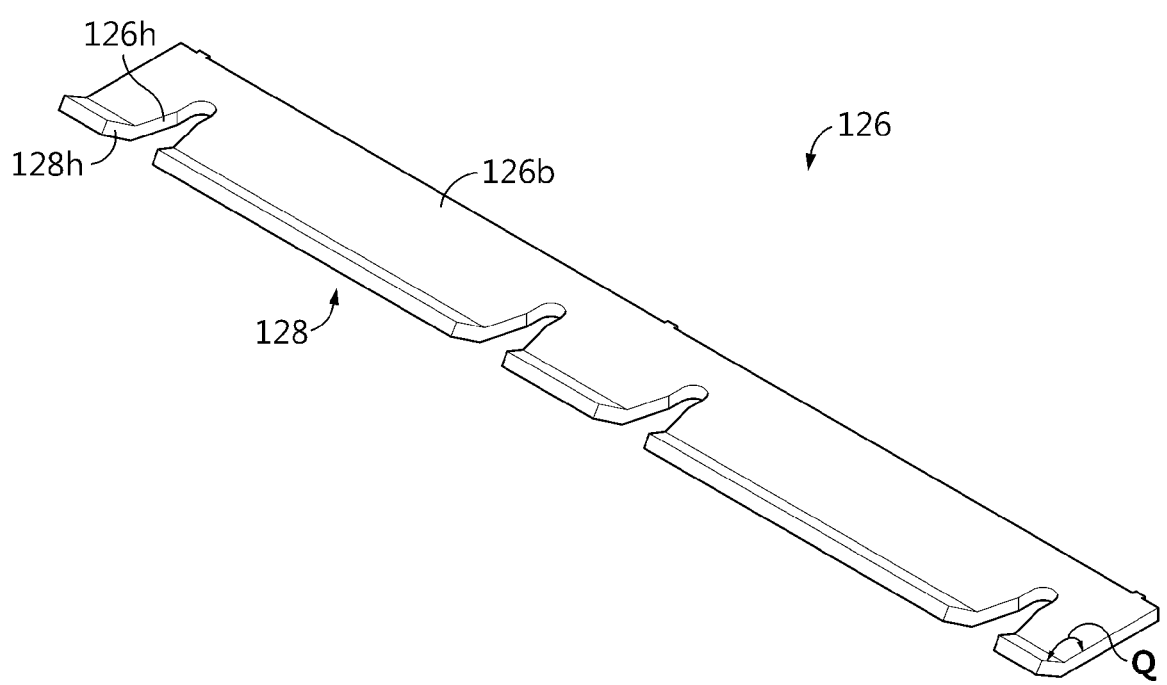
FIG. 11 is a perspective view schematically illustrating a fixing unit of a battery rack according to another embodiment of the present disclosure.

FIG. 11 is a perspective view schematically illustrating the fixing unit of the battery rack according to another embodiment of the present disclosure.

Referring to FIG. 11, the fixing unit 126 of the battery rack 100 according to another embodiment of the present disclosure may further include a guide unit 128 when compared with the fixing unit 126 of FIG. 4.

Specifically, the guide unit 128 may be configured to guide a movement of the fixing unit 126. The guide unit 128 may have a side parallel to an upper surface of the connection unit 125 or of the ground at the bottom so as to be movable along the upper surface of the connection unit 125 or the ground. For example, as shown in FIG. 11, the guide unit 128 may be a portion protruding and extending in an outer direction from the edge of the main body part 126*b* of the fixing unit 126. The guide unit 128 may have a shape bent at a predetermined angle Q from the edge of the main body part 126*b*. The guide unit 128 may have a shape bent, for example, at an angle of about 30 degrees from the edge of the main body part 126*b*.

Therefore, according to such a configuration of the present disclosure, the present disclosure may guide the fixing unit 126 to slide and move along the upper surface of the connection unit 125 or the ground through the guide unit 128.

For example, when the fixing groove 126*h* is inserted into the bolt B fixed to the bottom in a state where the battery rack 100 is inclined at an angle of 30 degrees with respect to the up-down direction, the guide unit 128 bent at an angle of 30 degrees from the main body part 126*b* has the side parallel to the upper surface of the connection unit 125 or the ground. Accordingly, the guide unit 128 may easily slide and move the battery rack 100 in the horizontal direction without shaking in the up-down direction while moving along the upper surface of the connection unit 125 or the ground.

In addition, the guide unit 128 may include an extension groove 128*h*. The extension groove 128*h* may be formed to be recessed in the inner direction of the body from a protruding edge of the guide unit 128. That is, the extension groove 128*h* may be configured to be communicatively connected to the fixing groove 126*h* of the fixing unit 126.

Therefore, according to such a configuration of the present disclosure, the guide unit 128 includes the extension groove 128*h*, thereby guiding the bolt B to be inserted into the fixing groove 126*h* formed in the fixing unit 126. That is, the guide unit 128 may guide the bolt B to be first inserted into the extension groove 128*h* and then move to the fixing groove 126*h* through the extension groove 128*h* while moving along the upper surface of the connection unit 125 or the ground. Accordingly, the guide unit 128 of the present disclosure may facilitate the installation of the battery rack 100.

Figure 12:
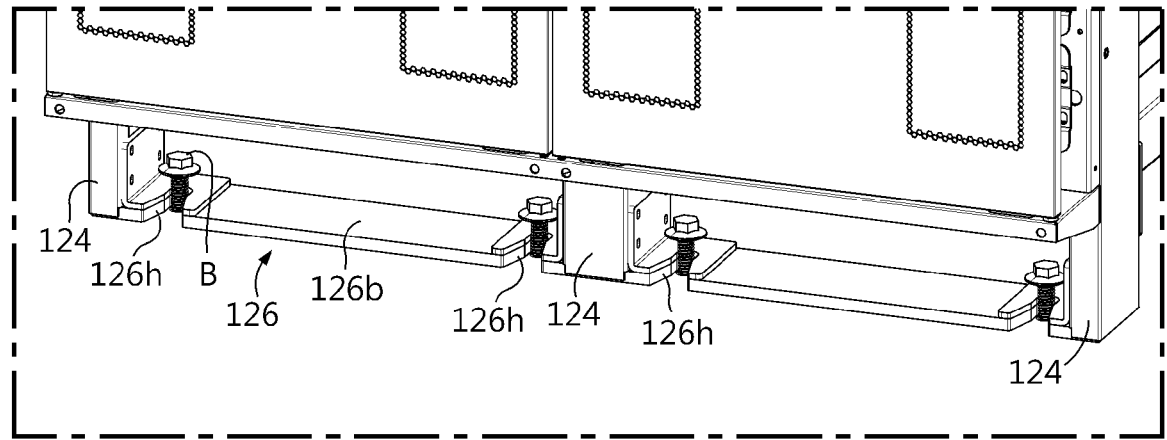
FIG. 12 is a partial perspective view schematically illustrating a part of the front of the battery rack of FIG. 1.

FIG. 12 is a partial perspective view schematically illustrating a part of the front of the battery rack of FIG. 1.

Referring to FIG. 12, the battery rack 100 according to an embodiment of the present disclosure may be fixedly coupled to the bottom through the bolt B fixed to the ground of an installation site. Specifically, the rack case 120 may be configured such that a body of the bolt B fixed to the bottom is slide-inserted into the fixing groove 126*h* of the fixing unit 126 of the front frame 122 in the horizontal direction. Thereafter, by tightening the bolt B, the fixing unit 126 may be fixed to the bottom.

Figure 13:
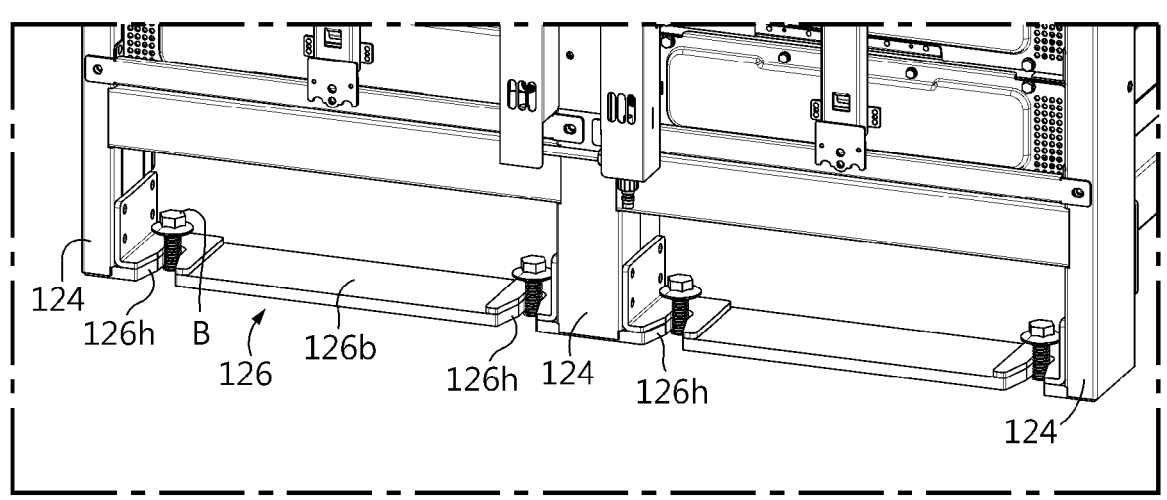
FIG. 13 is a partial perspective view schematically illustrating a part of the rear of the battery rack of FIG. 1.

FIG. 13 is a partial perspective view schematically illustrating a part of the rear of the battery rack of FIG. 1.

Referring to FIG. 13, the battery rack 100 according to an embodiment of the present disclosure may be fixedly coupled to the bottom through the bolt B fixed to the ground of an installation site. Specifically, the rack case 120 may be configured such that a body of the bolt B fixed to the bottom is slide-inserted into the fixing groove 126*h* of the fixing unit 126 of the rear frame 123 in the horizontal direction. Thereafter, by tightening the bolt B, the fixing unit 126 may be fixed to the bottom.

In the related art, there could be a case where an operator could not secure a working space to perform a bolting operation at the rear of the battery rack in order to fix the battery rack to the bottom.

Accordingly, the inventor of the present disclosure may previously fix the bolt B to the installation bottom by a predetermined depth, make a form in which the bolt B is erected in the upper direction from the ground, and then slide and move the battery rack 100 rearward so that the body of the bolt B may be inserted into the fixing groove 126*h*. Then, the operator may tighten the bolt B inserted into the fixing groove 126*h* using a long bar-shaped spanner at the front of the battery rack 100 so that the rear frame 123 may be fixed to the bottom. More specifically, for example, the bolt B may be previously fixed to the installation bottom of the rear side of the battery rack 100 by a predetermined depth. Thereafter, the battery rack 100 may slide and move rearward and then the bolt B inserted into the fixing groove 126*h* may be tightened. Accordingly, the position of the battery rack 100 may be fixed. Therefore, the position of the fixing groove 126*h* on the front side may be determined. Thereafter, the battery rack 100 may be additionally fixed to the installation bottom by inserting the bolt B into the fixing groove 126*h* provided in the front side of the battery rack 100. Here, a method of fixing the battery rack 100 to the installation bottom has been described, but the method may also be applied to a method of fixing the battery rack 100 to an upper portion of the other battery rack 100 as well as the installation bottom.

Therefore, according to such a configuration of the present disclosure, the fixing groove 126*h* is included in the fixing unit 126 of each of the front frame 122 and the rear frame 123, and thus the battery rack 100 may be stably fixed to the bottom of a storage place. In addition, the present disclosure may stably fix the battery rack 100 to the bottom of a transport device, thereby stably maintaining a fixed state even when an external impact occurs during transport. In addition, present disclosure may facilitate fixing the battery rack 100 to the installation place.

Meanwhile, referring to FIG. 2, the energy storage system 200 according to the present disclosure may include one or more battery racks 100 according to the present disclosure described above. The battery rack 100 may include the rack cases 120A and 120B stacked in the up-down direction. The energy storage system 200 may be implemented in various forms, such as a smart grid system or an electric charging station.

Meanwhile, the present disclosure provides a power generation system including at least one battery rack 100. The power generation system may include a hydro power generator, a thermal power generator, a wind power generator, a solar generator, etc. Electricity generated from such a generator may be stored in the battery rack 100.

Meanwhile, although the terms indicating directions such as up, down, left, right, front, and back are used herein, these terms are only for convenience of description, and it is obvious to one of ordinary skill in the art that the terms may vary depending on the location of a target object or the location of an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery rack comprising:
a plurality of battery modules; and
a rack case configured to accommodate the plurality of battery modules and mount to a second rack case above the rack case,
wherein the rack case comprises a fixer provided on a lower end portion of the rack case,
wherein the fixer comprises a main body part of a plate shape,
wherein the main body part comprises a fixing groove formed to be recessed from an edge of the main body part,
wherein the rack case comprises at least one bolt provided on an upper end portion of the rack case and configured to be inserted into the fixing groove included in a lower end of the second rack case, and
wherein the fixer comprises:
a restraining bar configured to protrude into the fixing groove; and
an accommodation groove having an internal space to accommodate at least a part of the restraining bar.

2. The battery rack of claim 1, wherein the rack case comprises:
a plurality of shelf frames configured to mount the plurality of battery modules;
a front frame coupled to a front end of the plurality of shelf frames; and
a rear frame coupled to a rear end of the plurality of shelf frames.

3. The battery rack of claim 2, wherein each of the front frame and the rear frame comprises:
a plurality of pillar portions extending long in a vertical direction; and
a connector having a plate shape extending in a horizontal direction to connect upper portions of the plurality of pillar portions and comprising at least one bolt hole having a part punched such that the at least one bolt is inserted.

4. The battery rack of claim 3, wherein the main body part extends in the horizontal direction to connect lower end portions of the plurality of pillar portions, and
wherein the fixing groove is formed to be recessed from an edge of the main body part so that a body of the at least one bolt is inserted.

5. The battery rack of claim 4, wherein the at least one bolt protrudes upward so that a part of the body is inserted into the at least one bolt hole of the connector, and a remaining part of the body can be inserted into a fixing groove of the second rack case.

6. The battery rack of claim 3, wherein each of the front frame and the rear frame comprises a bracket, the bracket comprising:
a horizontal section mounted on the fixer and including a slit groove having a shape corresponding to the fixing groove; and
a vertical section having a shape bent and extending in an upper direction from an end portion of the horizontal section and configured to be bolt-fastened to a pillar portion of the plurality of pillar portions.

7. The battery rack of claim 1, wherein the fixing groove comprises:
a taper portion having a width that is gradually reduced in a recessed direction from the edge of the main body part; and
an accommodation portion having an opening such that the at least one bolt is accommodated.

8. The battery rack of claim 7, wherein the restraining bar is configured to protrude so as to partition between the taper portion and the accommodation portion.

9. The battery rack of claim 8, wherein the fixer further comprises an elastic member provided in the accommodation groove and configured to pressurize the restraining bar to protrude from the accommodation groove.

10. The battery rack of claim 1, wherein the fixer further comprises a guide protruding and extending in an outer direction from the edge of the main body part so as to guide a movement of the fixer.

11. The battery rack of claim 10, wherein the guide is bent upward at a predetermined angle from the main body part.

12. The battery rack of claim 10, wherein the guide comprises an extension groove communicatively connected to the fixing groove and formed to be recessed from an edge protruding and extending from the main body part.

13. An energy storage system comprising at least one battery rack according to claim 1.

14. A power generation system comprising at least one battery rack according to claim 1.

* * * * *